Dec. 30, 1969 G. E. ANDERSON ET AL 3,487,165

VIDEO PEAKING CONTROL NETWORK

Filed May 23, 1966

INVENTORS
GEORGE E. ANDERSON
& DONALD H. WILLIS
BY Eugene M. Whitacre
Attorney

United States Patent Office 3,487,165
Patented Dec. 30, 1969

3,487,165

VIDEO PEAKING CONTROL NETWORK

George Edward Anderson and Donald Henry Willis, Indianapolis, Ind., assignors to RCA Corporation, a corporation of Delaware Filed May 23, 1966, Ser. No. 552,028
Int. Cl. H04n 3/16, 5/44
U.S. Cl. 178—7.5 5 Claims

ABSTRACT OF THE DISCLOSURE

A peaking control circuit includes a series inductor between a video source and utilization means. A potentiometer and a capacitor are connected from one terminal of the inductor to ground. The slider of the potentiometer is connected to the other terminal of the inductor. In a first limit position of the slider the inductor is shorted and the frequency band pass for the video signal at the utilization means is greatest. For intermediate positions of the slider the inductor series resonates towards the low video frequency components while attenuating the high frequency components. For a second limit position of the slider the capacitor serves to bypass high frequency video signals, which may include high frequency noise components, to a point of reference potential.

This invention relates to electrical signal translating networks, and more particularly to high frequency peaking control circuits for video amplifiers.

In television receivers it is sometimes desirable to change the video response of the receiver in order to produce a more pleasing, noise-free image. A change in the video response may be desired when noise is present in the receiver due to weak signals, electrical interference, transmission shortcomings, etc. During monochrome reception the image may be made more pleasing by adjusting the fine tuning control to detune the tuner. However during color reception such detuning may result in the loss of color information. Accordingly, for color television receivers it is desirable to provide a video peaking control which may be adjusted by the viewer to permit adjustment of the video frequency response to produce a more pleasing image in accordance with individual tastes.

A video high frequency peaking control circuit in accordance with one embodiment of the invention includes a peaking inductor connected between a video signal source and suitable utilization means. By way of example, the video signal source may comprise the final luminance amplifier of a color television receiver and the utilization means may comprise a color kinescope. The series combination of a potentiometer and a capacitor are connected from one terminal of the peaking inductor to a point of reference potential. An adjustable slider on the potentiometer is connected to the other terminal of the peaking inductor. The parameters of the various circuit components are such that in a first limit position of the adjustable slider, the peaking inductor is effectively shorted out, and the resistance of the potentiometer effectively isolates the capacitor from the circuit whereby a first condition of high frequency video peaking is obtained. For intermediate points along the potentiometer the peaking inductor presents a higher series impedance to higher frequency video signals than to lower frequency video signals. The peaking inductor is selected to be series resonant with the utilization means capacitance at a frequency near the lower end of the video frequency range, thus increasing the relative gain at lower frequencies. At intermediate control positions the capacitor is effectively out of the circuit because the resistance of the potentiometer is large relative to the impedance of the capacitor.

In a second limit position the peaking inductor is in the circuit presenting a higher series impedance for higher than for lower frequency video signals. In addition, the capacitor bypasses high video frequency signals to the point of reference potential. Since noise has most of its components at the higher video frequencies it is effectively attenuated.

The novel features which are considered to be characteristic of this invention are set forth in particularity in the appended claims. The invention itself, however, both as to its organization and method of operation, as well as additional objects and advantages thereof will best be understood from the following description when read in connection with the accompanying drawing in which:

Figures 1, 2, 3, 4:
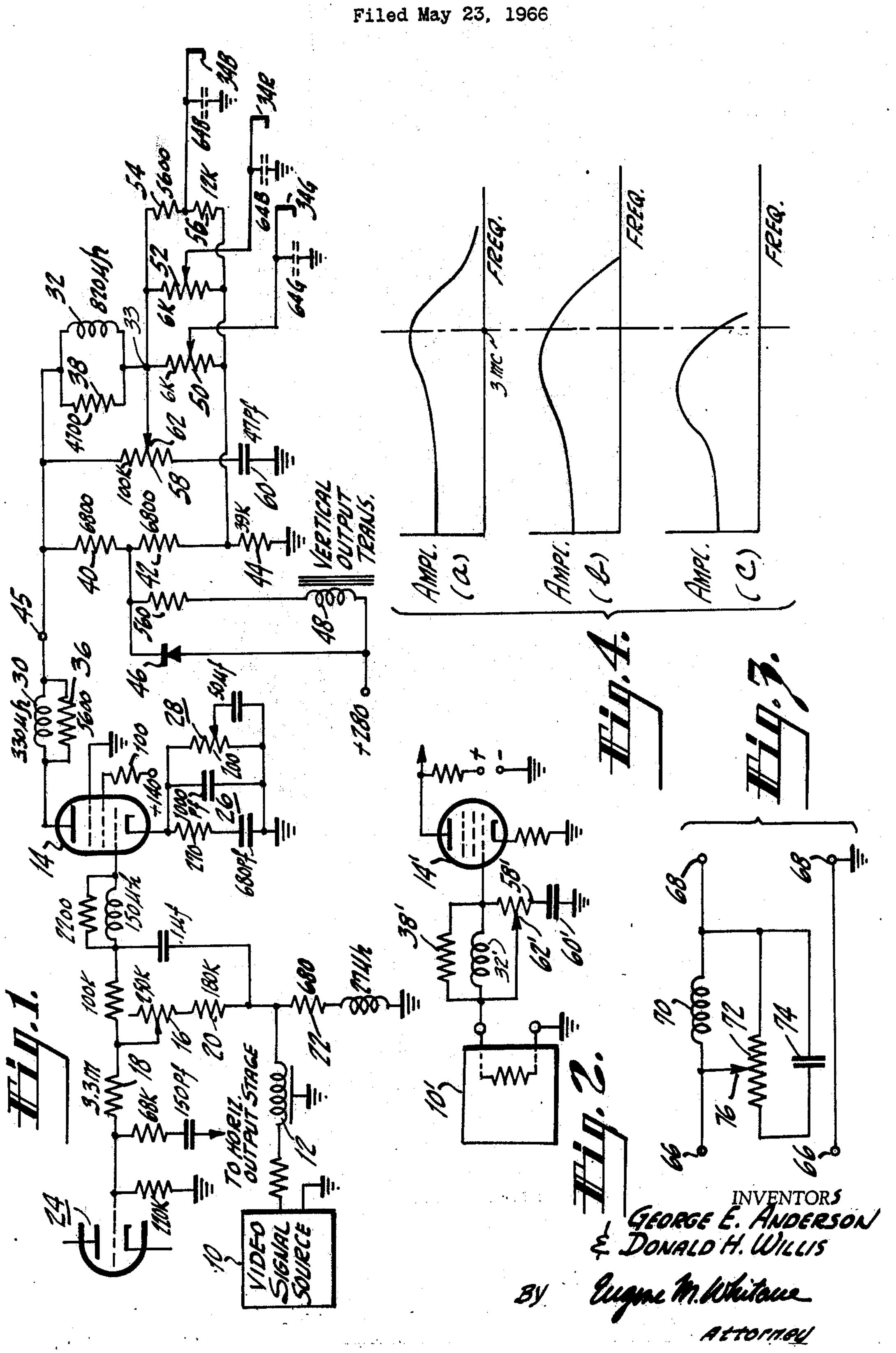
FIGURE 1 is a simplified schematic circuit diagram of a video amplifier for color television receivers including a continuous video peaking control network embodying the invention.
FIGURE 2 is a simplified schematic circuit diagram of a portion of a video amplifier in accordance with another embodiment of the invention.
FIGURE 3 is a simplified schematic circuit diagram of a further embodiment of a high frequency video peaking control circuit.
FIGURE 4 is a graph showing the response as a function of frequency for various settings of the video peaking control potentiometer of the video amplifiers shown in FIGURES 1 and 2.

With reference to FIGURE 1, a video signal source 10 is coupled through a delay line 12 to the input circuit of a video or luminance amplifier stage 14. The input circuit for the video amplifier stage 14 includes a brightness control potentiometer 16 which forms a portion of a voltage divider network including the resistors 18, 20 and 22, connected from the grid of a blanker tube 24 to ground. As is known, a negative voltage developed at the grid of the blanker tube in response to pulses from the horizontal deflection circuitry may be used as a source of biasing potential for the video amplifier. Adjustment of the slider on the brightness control potentiometer 16 adjusts the direct current operating point of the video amplifier stage 14 and hence the brightness of the reproduced image.

The cathode circuit of the video amplifier stage 14 includes a high frequency video peaking network 26 and a contrast control circuit 28.

The output circuit of the video amplifier stage 14 includes first and second high frequency video peaking inductors 30 and 32 connected in series between the anode of the video amplifier tube and an output terminal 33 to which is connected utilization means represented by the three cathodes 34B, 34R and 34G of a color kinescope. The peaking inductors 30 and 32 are shunted respectively by damping resistors 36 and 38.

Three resistors 40, 42 and 44 are connected in series from a terminal 45 to ground. A normally conducting diode 46 is connected from the junction of the resistors 40 and 42 to the positive terminal of a power supply which provides the anode operating voltage for the video amplifier stage 14 and the bias voltage supply for the cathodes of the color kinescope.

During the vertical retrace interval, a voltage pulse is developed across a winding 48 on the vertical deflection circuit output transformer which reverse biases the diode 46 and applies a blanking pulse of suitable amplitude to the cathodes of the color kinescope.

The drive controls for setting the bias on the respective cathodes 34B, 34R and 34G includes a pair of potentiometers 50 and 52 for setting the direct voltage bias on the cathodes 34G and 34R respectively, and a voltage divider including a pair of resistors 54 and 56 connected for establishing the bias on the cathode 34B.

Control of the video peaking which is provided at one or more points at the video amplifier channel, including the stages 10 and 14, is effected by a potentiometer 58 and a capacitor 60 connected in series from the terminal 45 to ground. A slider 62 on the potentiometer 58 is connected to the output terminal 33.

In describing the operation of the video peaking control circuit it will be assumed first that the slider 62 is at a position adjacent the terminal 45. In this position the peaking inductor 32 and the resistor 38 are shorted out and are not in the circuit. In addition, the resistance of the potentiometer 58 is much greater than the reactance of the capacitor 60 or the effective load impedance between the terminal 33 and ground so that neither the potentiometer 58 nor capacitor 60 affect the peaked high frequency video response. As a result, the high frequency video peaking provided at other points in the video signal channel is effective and provides an amplitude versus frequency response diagrammatically illustrated in FIGURE 4*a*.

With the slider 62 at intermediate points along the potentiometer 58, such as near the center thereof, the peaking inductor 32 and damping resistor 38 are in the circuit and present a greater series impedance to the higher frequency video signals than to the lower frequency signals. The peaking inductor 32 may be chosen so that it will resonate with the effective input capacitances 64B, 64R and 64G of the color kinescope cathodes 34B, 34R and 34G in the lower video frequency range, such as at about one megacycle, thus increasing the relative gain at the lower frequencies. At intermediate control positions of the slider 62 the capacitor 60 is substantially ineffective because its impedance at video frequencies is significantly smaller than the resistance between the slider 62 and the capacitor 60. The response of the amplifier for such settings of the slider 62 is shown in FIGURE 4*b*.

In the other limit position where the slider 62 is adjacent the capacitor 60, the peaking inductor 32 and damping resistor 38 are in the circuit and offer a higher series impedance to the higher video frequency signals than to the lower video frequency signals. In addition, the capacitor 60 provides a shunt path to ground for the higher frequency video signals. The response of the overall system under these conditions is shown in FIGURE 4*c* where the higher video frequency signals are substantially attenuated. Since noise has most of its components in the higher video frequency range, it will be seen that such components are effectively attenuated. The slider 62 may be operated by suitable control means available to the operator of the television receiver including the circuit described to permit adjustment of the video frequency peaking and the desired image reproduction. It will be understood by persons skilled in the art that the circuit may be modified without departing from the scope of the invention by changing the connections of potentiometer 58 such that the slider 62 is disconnected from the output terminal 33 and connected to the terminal 45, and the potentiometer 58 disconnected from the terminal 45 and connected to the terminal 33.

Another embodiment of the invention is shown in FIGURE 2 in which the video peaking control circuit is connected in the input circuit of a video amplifier 14'. In this circuit the inductor 32' and damping resistor 38' are serially connected between a video signal source 10' and the control grid of the video amplifier tube 14'. The video peaking control potentiometer 58' and capacitor 60' are connected between the control grid and ground, and the adjustable slider 62' is connected to the input terminal of the inductor 32'. As mentioned above the connections of the slider 62' and potentiometer 58' with respect to the inductor 32' may be reversed. The operation of the circuit shown in FIGURE 2 is the same as that described above in connection with FIGURE 1.

The video peaking control circuit shown in FIGURE 3 is adapted to be connected in series between a video signal source coupled to the input terminals 66, and a utilization circuit coupled to the output terminal 68. In this circuit an inductor 70 is serially connected between the high signal input terminal 66 and the high signal output terminal 68. A potentiometer 72 which is connected in parallel with the capacitor 74 is connected to the high signal potential output terminal 68, and an adjustable slider 76 is connected to the input terminal 66. It should be noted that the connections of the slider 76 and potentiometer 72 may be reversed with respect to the input and output terminals. In the circuit as shown, when the slider 76 is adjacent the output terminal 68 the inductor 70 is shorted and no attenuation is imposed on the high frequency video peaking designed into the circuit. When the slider 76 is in an intermediate position the inductor 70 in parallel with the resistance between the slider 76 and the output terminals 68 provides a series impedance which increases with frequency to provide higher selective attenuation of video signals toward the higher frequency end of the range. As the slider 76 is moved to position adjacent the end of potentiometer 72 remote from the connection to the output terminal 68, the capactior 74 becomes more effective. The capacitor 74 and the inductor 70 are parallel resonant in the higher portion of the video frequency range thus providing further series attenuation of the higher frequency video signals.

What is claimed is:

1. A video peaking control circuit comprising:
means providing a source of video frequency signals; utilization means;
an inductor connected in series between said source of video frequency signals and said utilization means;
a resistor having an adjustable slider, said slider connected to one terminal of said inductor, the other terminal of said inductor connected to one terminal of said resistor, and
a capacitor, having a reactance at high frequency video signals whose magnitude is substantially less than the magnitude of said resistor, connected to the other terminal of said resistor to enable said circuit to operate for a first extreme position of said slider to bypass said inductor through said slider and isolate said capacitor by means of said resistor whereby neither has any substantial effect on said video frequency signals from said source, and in a second opposite extreme position of said slider to cause said inductor to offer maximum attenuation while said capacitor simultaneously bypasses video signals of higher video frequencies.

2. A video peaking control circuit comprising:
an input terminal for connection to a source of video frequency signals;
an output terminal for connection to said utilization means;
a third terminal for connection in common to said source of video frequency signals and said utilization means;
an inductor in series between said input terminal and said output terminal; and
a resistor and a capacitor connected in series between one of said input and output terminals and said third terminal, a slider on said resistor being connected to the other of said input and output terminals, said inductor bypassed through said slider and said capacitor isolated by means of said resistor in a first extreme position of said slider whereby said video signals are substantially unattenuated as from said source, and in a second opposite extreme position of said slider to cause said inductor to offer maximum attenuation to higher frequency video signals, while said capacitor in said second position of said slider bypasses a portion of said video signals of said higher video frequencies to said third terminal.

3. A video peaking circuit as defined in claim 2 wherein the resistance value of said resistor is at least ten times larger relative to the reactance value of said capacitor to signals near the high frequency end of the video signal frequency range.

4. A video peaking control circuit as defined in claim 3 wherein said utilization means includes a predetermined capacitance between said output terminal and said third terminal, the inductance value of said inductor and the capactiance value of said utilization means resonant near the low frequency end of the video signal frequency range.

5. A video peaking control circuit as defined in claim 4 wherein said inductor resonates with the capacitance of said utilization means at a frequency of about one megacycle.

References Cited

UNITED STATES PATENTS

| | | |
|---|---|---|
| 2,514,112 | 7/1950 | Wright et al. |
| 2,615,089 | 10/1952 | Rogers. |
| 3,005,870 | 10/1961 | Ruby et al. |
| 3,320,361 | 5/1967 | Stroh. |

RICHARD MURRAY, Primary Examiner

ALFRED H. EDDLEMAN, Assistant Examiner